(12) United States Patent
Perez

(10) Patent No.: US 10,436,983 B2
(45) Date of Patent: Oct. 8, 2019

(54) MACHINE-TO-MACHINE PLANT AUTOMATION USING 3D PRINTED FIBER SPLICING

(71) Applicant: Verizon Patent and Licensing, Inc., Basking Ridge, NJ (US)

(72) Inventor: John Scott Perez, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1602 days.

(21) Appl. No.: 14/084,267

(22) Filed: Nov. 19, 2013

(65) Prior Publication Data

US 2015/0137398 A1 May 21, 2015

(51) Int. Cl.

| B29C 67/00 | (2017.01) |
| G02B 6/255 | (2006.01) |
| B33Y 30/00 | (2015.01) |
| B33Y 10/00 | (2015.01) |
| B33Y 50/02 | (2015.01) |
| B33Y 80/00 | (2015.01) |
| B29D 11/00 | (2006.01) |
| B29K 83/00 | (2006.01) |
| B29K 75/00 | (2006.01) |
| B29K 101/00 | (2006.01) |
| B29K 105/00 | (2006.01) |

(52) U.S. Cl.
CPC ........ *G02B 6/2553* (2013.01); *B29D 11/0075* (2013.01); *B33Y 10/00* (2014.12); *B33Y 30/00* (2014.12); *B33Y 50/02* (2014.12); *B33Y 80/00* (2014.12); *G02B 6/2555* (2013.01); *B29K 2075/00* (2013.01); *B29K 2083/00* (2013.01); *B29K 2101/00* (2013.01); *B29K 2105/0058* (2013.01); *B29K 2995/0018* (2013.01)

(58) Field of Classification Search
CPC ..................... B29C 67/0051; B29C 67/0085
USPC ......................................... 264/1.25; 425/108
See application file for complete search history.

(56) References Cited

U.S. PATENT DOCUMENTS

| 5,351,331 A | * | 9/1994 | Chun | ................... | G02B 6/3801 156/158 |
| 2007/0062383 A1 | * | 3/2007 | Gazeau | ................. | B41J 3/4073 101/35 |
| 2009/0167817 A1 | * | 7/2009 | Orr | ........................ | B41J 3/4073 347/37 |
| 2010/0303432 A1 | * | 12/2010 | Chen | ....................... | B08B 11/00 385/135 |
| 2013/0015596 A1 | * | 1/2013 | Mozeika | ................ | B25J 9/0084 264/40.1 |
| 2013/0209600 A1 | * | 8/2013 | Tow | ................... | G01N 35/1011 425/375 |

* cited by examiner

*Primary Examiner* — Christina A Johnson
*Assistant Examiner* — Xue Liu

(57) ABSTRACT

A system may include a fiber distribution hub including a plurality of fiber-optic cables, wherein a particular one of the plurality of fiber-optic cables includes a machine-readable identifier; and a robotic device configured to access particular ones of the plurality of fiber-optic cables. The robotic device may include a print head configured to splice together the particular ones of the plurality of fiber-optic cables by three-dimensional printing of a silane material. A hand-held unit may also include a print head configured to splice together fiber-optic cables by three-dimensional printing of a silane material.

15 Claims, 15 Drawing Sheets

MACHINE-TO-MACHINE PLANT AUTOMATION USING 3D PRINTED FIBER SPLICING

BACKGROUND INFORMATION

Optical fiber networks are used by providers of telecommunication services for transmission across the core and to the edge of telecommunication networks. While electronic cross-overs may be used to handle metal patch automation in electrical communication networks, patching of optical fibers has been problematic. Patching of optical fibers may require a large amount of manual labor and training, as well as costly cleaning materials and receptacles. Other problems associated with patching of optical fibers include loss of signal at fiber junctions, human errors during fiber splicing, and the high cost of fiber splicing equipment. The high cost and time requirements to patch optical fibers have impacted the installation, maintenance, repair, and reconfiguration of optical fiber networks.

DETAILED DESCRIPTION OF PREFERRED EMBODIMENTS

The following detailed description refers to the accompanying drawings. The same reference numbers in different drawings identify the same or similar elements.

Implementations described herein relate to three dimensional (3D) printed splicing of optical fibers and to machine-to-machine plant automation using 3D printed optical fiber splicing. A fiber splicing machine may be used to align optical fibers for splicing and to clean the ends of the fibers in preparation for splicing. In some implementations, a pre-mold may be added to the junction site in order to speed up the splicing process. The fiber splicing machine may then use a print head with a silane material, such as a chlorinated polysilane material, to 3D print a silica junction between optical fibers to splice the optical fibers together. After the print head ejects beads or droplets of the silane material, the silane material may cure to a silica glass material. After the silica junction is printed, the print head may print a cladding material around the silica junction, and may then print one or more protective layers on top of the cladding to complete the spliced optical fiber connection.

In some implementations, the fiber splicing machine may correspond to a hand-held, self-contained unit that may be carried by a technician in the field to repair, modify, and/or add optical fiber connections. In other implementations, the fiber splicing machine may be integrated in a robotic silo in a fiber distribution hub and may be configured to perform automated fiber patching. A robotic assembly may be used to move a fiber splicing machine to a particular location and identifiers (e.g., barcodes) on optical fibers may be used to identify and select particular fibers to be spliced. A robotic arm may move fibers into position and a print head may perform the 3D print splicing process to splice the fibers. Additionally, the robotic assembly may be used to remove a section of faulty fiber and splice in a new fiber section to repair a faulty fiber. Furthermore, loopback sections may be spliced into fibers in order to perform testing.

Furthermore, a robotic assembly in combination with 3D printing may be used in a copper plant to automate electrical connections. 3D printing may be used to print electrical connections. Wires may be spliced together using metal junctions and metal-based solders. Alternatively, metal junctions may be joined together using an electroplating process. The generation of metal junctions may be followed by 3D printing of plastic shielding.

Figure 1:
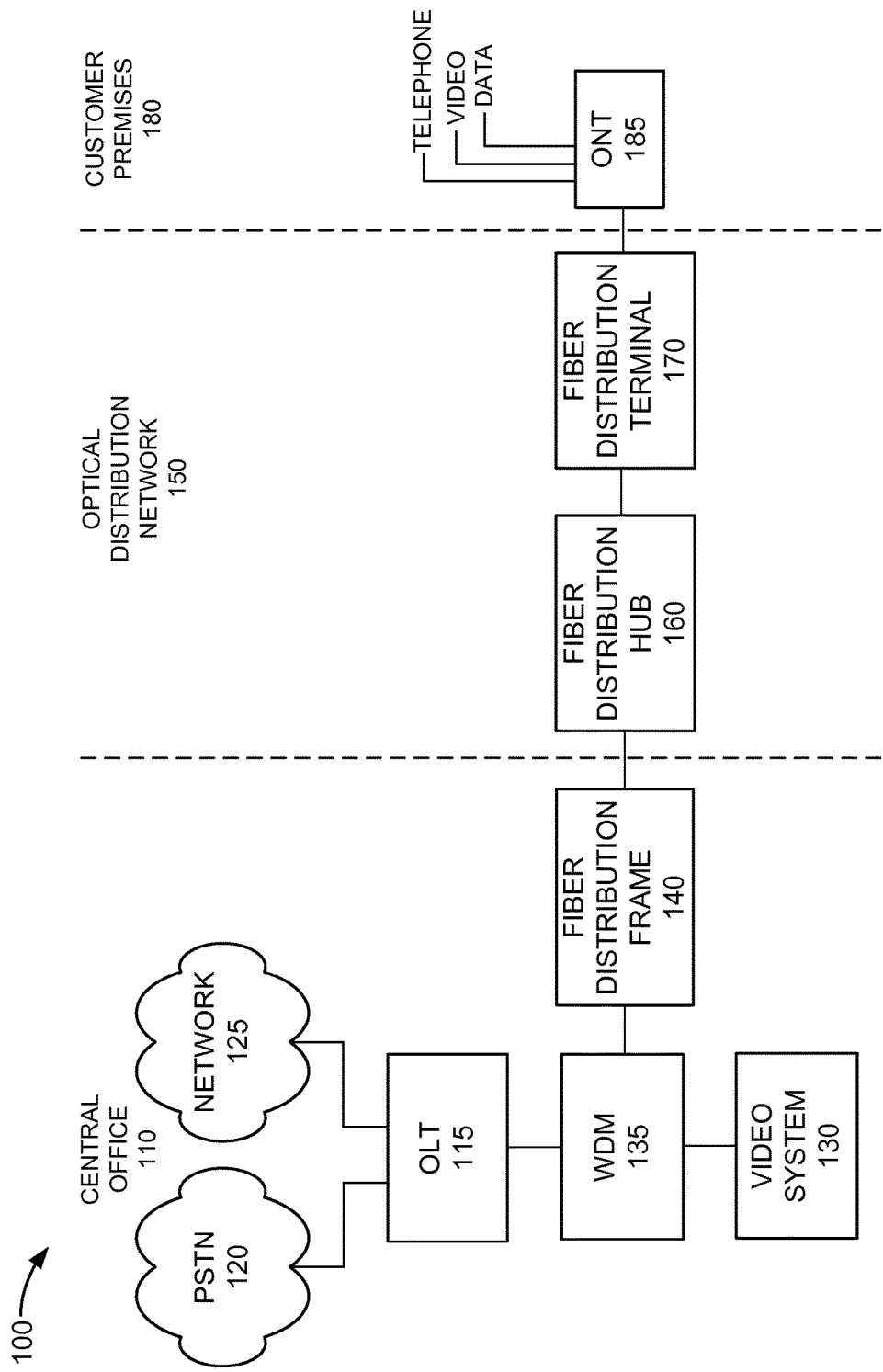
FIG. 1 is a diagram illustrating an environment according to an implementation described herein.

FIG. 1 is a diagram of an exemplary environment 100 in which the systems and/or methods described herein may be implemented. As shown in FIG. 1, environment 100 may include a central office 110, an optical distribution network 150, and a customer premises 180.

Central office 110 may provide telecommunication services for customers in a particular geographic area. For example, central office 110 may provide one or more of telephone services, television services, and/or data services. Central office may include an optical line termination (OLT) 115, a wave division multiplexer (WDM) 135, a video system 130, and a fiber distribution frame 140.

OLT 115 may terminate optical links from an optical network managed by central office 110 and/or may connect to outside optical and/or electrical networks. OLT 115 may connect to the public switched telephone network (PSTN) 120 and to a network 125. Network 125 may include one or more circuit-switched networks and/or packet-switched networks. For example, network 125 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Thus, central office 110 may provide telephone services by connecting to PSTN 120 via OLT 115 and data services by connecting to network 125 via OLT 115.

WDM 135 may combine signals from multiple optical fibers. For example, WDM 135 may combine optical signals from OLT 115 and video system 130. Video system 130 may receive television signals, via an optical network, from one or more content providers, such as free television broadcast providers (e.g., local broadcast providers, such as NBC, CBS, ABC, and/or Fox), for-pay television broadcast providers (e.g., TNT, ESPN, HBO, Cinemax, CNN, etc.), Internet-based content providers (e.g., Youtube, Vimeo, Netflix, Hulu, Veoh, etc.) that stream content from web sites and/or permit content to be downloaded (e.g., via progressive download, etc.), and/or on-demand content providers (e.g., video on demand (VOD), pay per view (PPV), etc.). Thus, central office 110 may provide television services by connecting to video system 130 via WDM 135. Fiber distribution frame 140 may include a structure that terminates fiber-optic cables from one or more optical distribution networks 150, and/or fiber-optic cables originating from central office 110, and that enables fiber-optic cables to be interconnected between each other.

Optical distribution network 150 may include an optical network that provides optical signals, via optical fibers in fiber-optic cables, to customers within a particular geographic area serviced by central office 110. Optical distribution network 150 may include one or more fiber distribution hubs 160 and one or more fiber distribution terminals 170. Fiber distribution hub 160 may receive a fiber feeder from fiber distribution frame 140 which includes multiple fiber-optic cables and may distribute the fiber-optic cables into smaller groupings of fiber-optic cables using one or more optical fiber splitters. Each of the smaller groupings of fiber-optic cables may terminate at a fiber distribution terminal 170. Fiber distribution terminal 170 may further distribute fiber-optic cables in the vicinity of customer premises 180 (e.g., in a residential neighborhood) into individual fiber-optic cables. An individual fiber-optic cable may connect to a particular customer premises 180 location.

Customer premises 180 may include a particular location (or multiple locations) associated with a customer. For example, customer premises 180 may include a residential location (e.g., a customer's home), a commercial location (e.g., a place of business), and/or another type of location associated with a customer. Customer premises 180 may include an optical network terminal (ONT) 185. ONT 185 may receive optical signals from central office 110 via optical distribution network 150 and may convert the optical signals into electrical signals that are delivered to devices in customer premises 180. Furthermore, ONT 185 may receive electrical devices from the devices in customer premises 180 and convert the electrical signals to optical signals that are sent to central office 110. A customer may, for example, receive one or more of television services, telephone services, and/or data services (e.g., an Internet connection) via ONT 185.

Although FIG. 1 shows exemplary components of environment 100, in other implementations, environment 100 may include fewer components, different components, differently arranged components, or additional components than the ones depicted in FIG. 1. Additionally or alternatively, one or more components of environment 100 may perform functions described as being performed by one or more other components of environment 100.

For example, while FIG. 1 shows a single OLT 115, a single WDM 135, a single video system 130, and a single fiber distribution frame 140 for illustrative purposes, in practice, central office 110 may include multiple OLTs 115, multiple WDMs 135, multiple video systems 130, and/or multiple fiber distribution frames 140. Similarly, optical distribution network 150 may include multiple fiber distribution hubs 160 and/or multiple fiber distribution terminals 170; and customer premises 180 may include multiple ONTs 185. Furthermore, a central office 110 may be connected to multiple optical distribution networks 150 and a particular optical distribution network 150 may be connected to multiple customer premises 180.

Figure 2A:
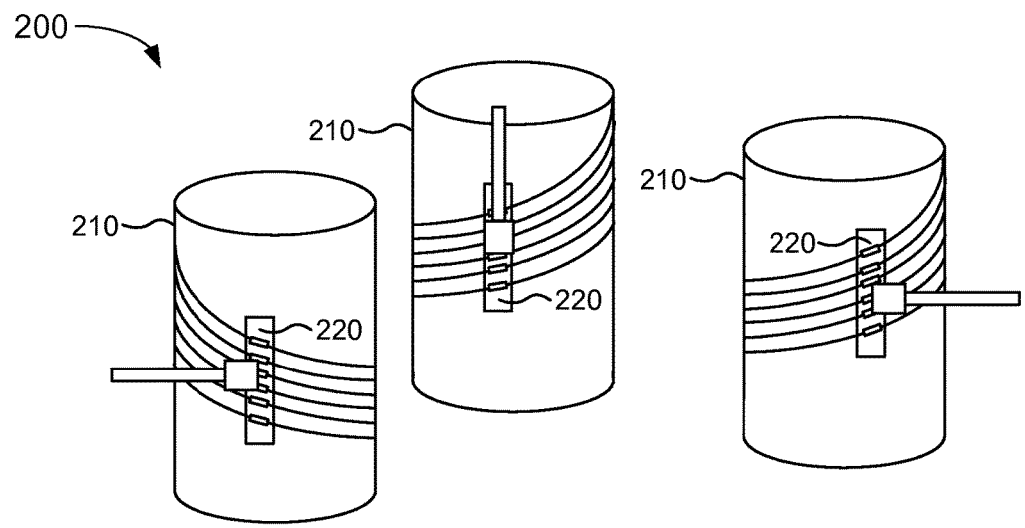
FIGS. 2A and 2B are diagrams illustrating exemplary components of a robotic silo system that may be includes in one or more of the components of FIG. 1.
Figure 2B:
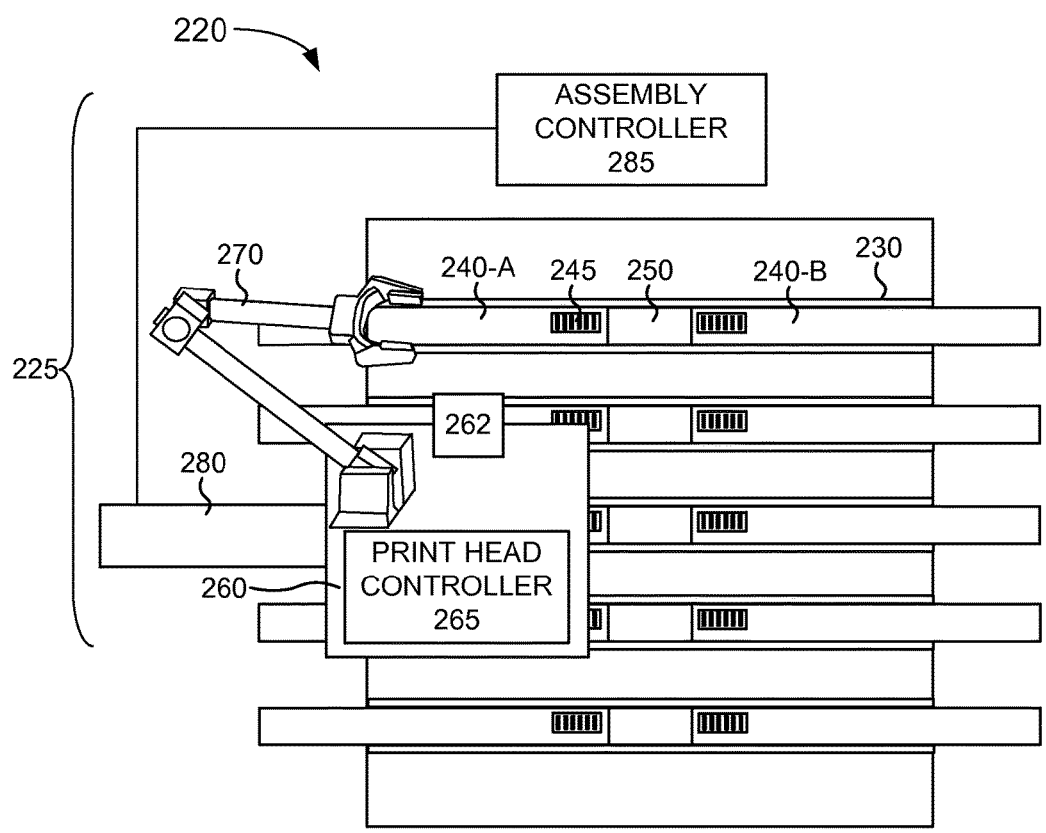

FIGS. 2A and 2B are diagrams illustrating exemplary components of a robotic silo system 200. Each of fiber distribution frame 140, fiber distribution hub 160, and/or fiber distribution terminal 170 may include one or more of robotic silo systems 200. As shown in FIG. 2A, robotic silo system 200 may include one or more robotic silos 210. Each robotic silo 210 may include a collection of fiber-optic cables configured so that the fiber-optic cables may be automatically patched using a robotic device. Each robotic silo 210 may include one or more automatic patch sites 220.

FIG. 2B illustrates an automatic splice site 220 associated with a particular robotic silo 210. As shown in FIG. 2B, automatic splice site 220 may include a robotic device 225, tracks 230, and fiber-optic cables 240. A particular track 230 may be used to align and/or secure in place a particular pair of fiber-optic cables 240. A first fiber-optic cable 240-A may be spliced to a second fiber-optic cable 240-B via optical junction 250 while aligned using track 230. Furthermore, each fiber-optic cable 240 may include a machine-readable identifier 245. Machine-readable identifier 245 may include a barcode, or another type of machine-readable code, that is readable by robotic device 225. Robotic device 225 may use machine-readable identifier 245 to identify a particular fiber-optic cable 230.

Robotic device 225 may include a print head 260, a print head controller 265, a robotic arm 270, a movement assembly 280, and an assembly controller 285. Print head 260 may include a 3D printer device configured to splice fiber-optic cables using 3D printing. Exemplary components of print head 260 are described below with reference to FIG. 3A. Print head 260 may include a reader 262. Alternatively, reader 262 may be located on a different component of robotic device 225. Reader 262 may be configured to read machine-readable identifier 245. For example, reader 262 may include a barcode reader.

Print head controller 265 may include logic configured to control print head 260 and/or robotic arm 270. Robotic arm 270 may be configured to manipulate fiber-cables 240. For example, robotic arm 270 may move cable 240-A into track 230 and may move cable 240-B into track 230. As another example, robotic arm 270 may move cable 240 from a first track 230 to a second track 230. Furthermore, robotic arm 270 may include a cutting mechanism (e.g., saw, laser, etc.) configured to remove a section of fiber-optic cable 240. The cutting mechanism may be used, for example, to remove a faulty section of fiber-optic cable 240 or to remove a previously printed splice junction. Moreover, robotic arm 270 may be configured to remove a pre-mold from a storage compartment and to place the pre-mold into track 230. The pre-mold may be used to reduce printing time to 3D print a splicing junction.

Movement assembly 280 may be configured to move robotic device 225 to a particular location on robotic silo 210. Assembly controller 285 may control movement assembly 280. As an example, assembly controller 285 may store information relating to the location of particular fiber-optic cables and may control movement assembly 280 to move to a particular location on robotic silo 210, associated with a particular fiber-optic cable, in response to a request to access the particular fiber-optic cable. As another example, reader 262 may scan machine-readable identifiers 245 as movement assembly 280 moves across robotic silo 210, and may stop when a particular fiber-optic cable 240 is identified.

Although FIGS. 2A and 2B show exemplary components of robotic silo system 200, in other implementations, robotic silo system 200 may include fewer components, different components, differently arranged components, or additional components than the ones depicted in FIGS. 2A and 2B. Additionally or alternatively, one or more components of robotic silo system 200 may perform functions described as being performed by one or more other components of robotic silo system 200.

Figure 3A:
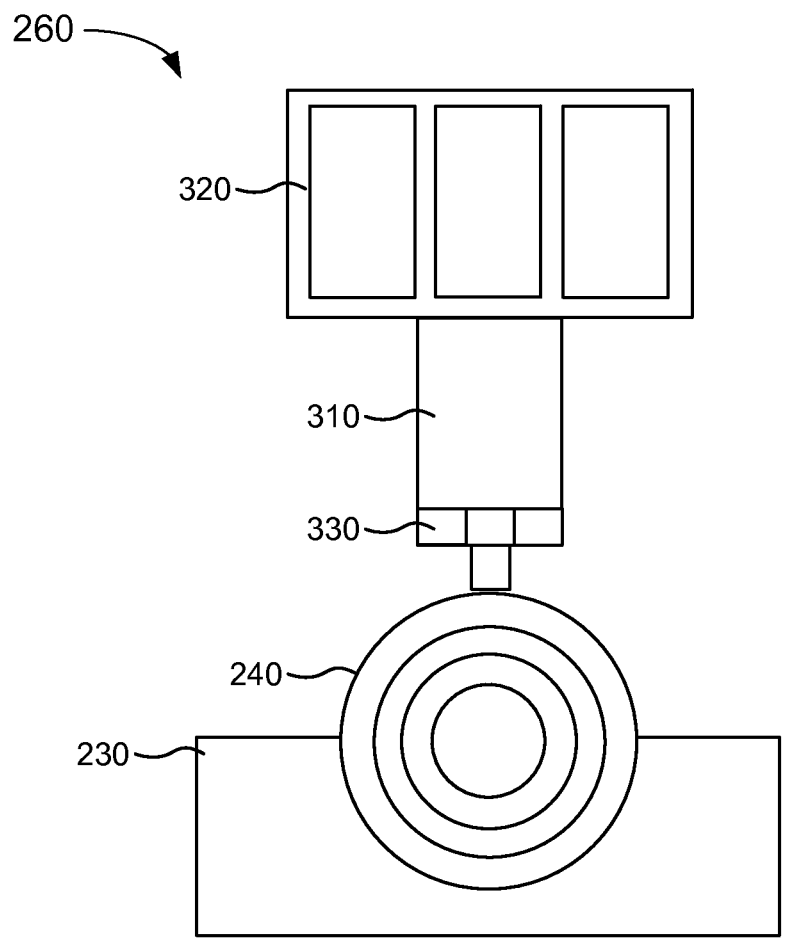
FIG. 3A is a diagram illustrating exemplary components of a print head of FIG. 1.

FIG. 3A is a diagram illustrating exemplary components of print head 260. As shown in FIG. 3A, print head 260 may include a printing mechanism 310 and print cartridges 320. Printing mechanism 310 may include a continuous inkjet print head, a thermal drop-on-demand inkjet print head, a piezoelectric drop-on-demand inkjet print head, and/or another type of inkjet print head. Each cartridge 320 may include a particular precursor material. For example, print head 260 may include a first cartridge 320 for a silane precursor material for 3D printing of a silica junction, a second cartridge 320 for a cladding precursor material for 3D printing of a cladding layer, and at least one cartridge 320 for a protective layer precursor material for 3D printing of a protective layer.

Printing mechanism 310 may include a set of proximity sensors 330. Proximity sensors 330 may include capacitive proximity sensors, capacitive displacement proximity sensors, inductive proximity sensors, passive optical proximity sensors, laser proximity sensors, and/or other types of proximity sensors. Proximity sensors 330 may be used by printing mechanism 310 to sense the edges of optical fibers and/or other components of fiber-optic cables, and/or to sense a distance of printing mechanism 310 from a material being 3D printed. Thus, proximity sensors 330 may enable printing mechanism 310 to print an optical fiber junction without requiring that the optical fibers which are to be spliced include cleanly cut edges.

Although FIG. 3A show exemplary components of print head 260, in other implementations, print head 260 may include fewer components, different components, differently arranged components, or additional components than the ones depicted in FIG. 3A. Additionally or alternatively, one or more components of print head 260 may perform functions described as being performed by one or more other components of print head 260.

As an example, in other implementations, print head 260 may include multiple printing mechanisms 310. For example, one or more of cartridges 320 may be associated with a different print head 260. Thus, additionally or alternatively to an inkjet printing mechanism, printing mechanism 310 may include an extrusion printing mechanism, an electron beam deposition printing mechanism, a direct metal laser sintering printing mechanism, a selective laser sintering printing mechanism, and/or another type of 3D printing mechanism. In some implementations, print head 260 may include a first printing mechanism 310 that includes an inkjet printing mechanism (e.g., to print a silica junction and cladding), and a second printing mechanism 310 that includes an extrusion printing mechanism (e.g., to print one or more protective layers). As another example, multiple cartridges, each including a different precursor material, may be used together during a particular printing process.

Figure 3B:
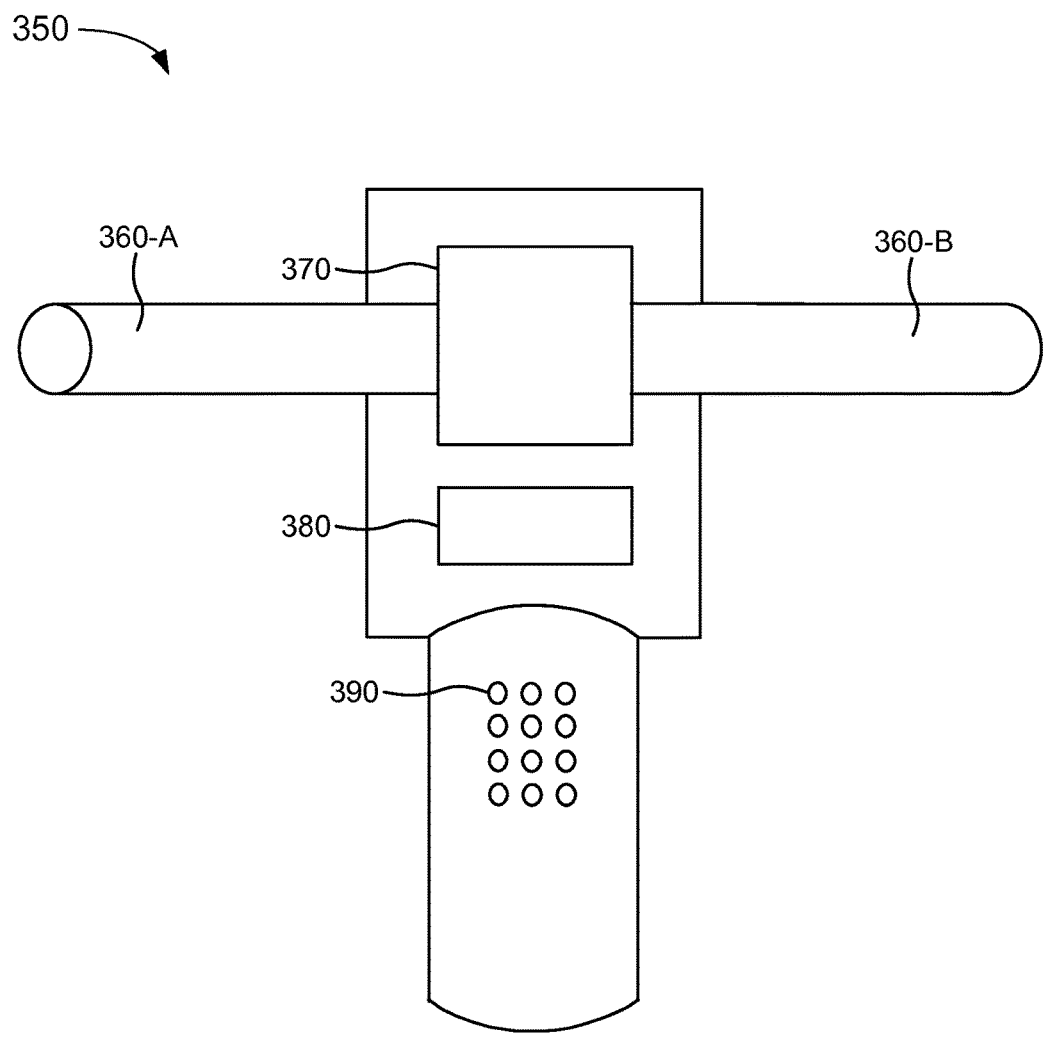
FIG. 3B is a diagram illustrating exemplary components of a hand-held unit for three dimensional print splicing of optical fibers according to one or more implementations described herein.

FIG. 3B is a diagram illustrating exemplary components of a hand-held unit 350 for three dimensional print splicing of optical fibers. Hand-held unit 350 may be carried by a technician in the field and may be used by the technician to splice a first fiber-optic cable 360-A with a second fiber-optic cable 360-B in the field. Additionally or alternatively, the technician may be deployed to repair a faulty fiber-optic cable, to add a new fiber-optic cable to a fiber distribution terminal 170, to add a loopback test to a particular fiber-optic cable to test transmission characteristics of the particular fiber-optic cable, and/or to perform another splicing procedure.

Hand-held unit 350 may include print head 260 (not shown in FIG. 3B). Furthermore, hand-held unit 350 may include an alignment device 370, an output device 380, and an input device 390. Alignment device 370 may include a track or another mechanism for aligning first fiber-optic cable 360-A with second fiber-optic cable 360-B. Output device 380 may include a display (e.g., liquid crystal display (LCD)) to provide information to the technician about the status of a splicing operation, to enable the technician to select options for a splicing operation (e.g., a sequence of printing operations, particular precursor materials, etc.), etc. Input device 390 may include a keypad, keyboard, touchscreen, and/or another type of input device to enable the technician to input commands into hand-held unit 350.

Although FIG. 3B show exemplary components of hand-held unit 350, in other implementations, hand-held unit 350 may include fewer components, different components, differently arranged components, or additional components than the ones depicted in FIG. 3B. Additionally or alternatively, one or more components of hand-held unit 350 may perform functions described as being performed by one or more other components of hand-held unit 350.

Figure 4:
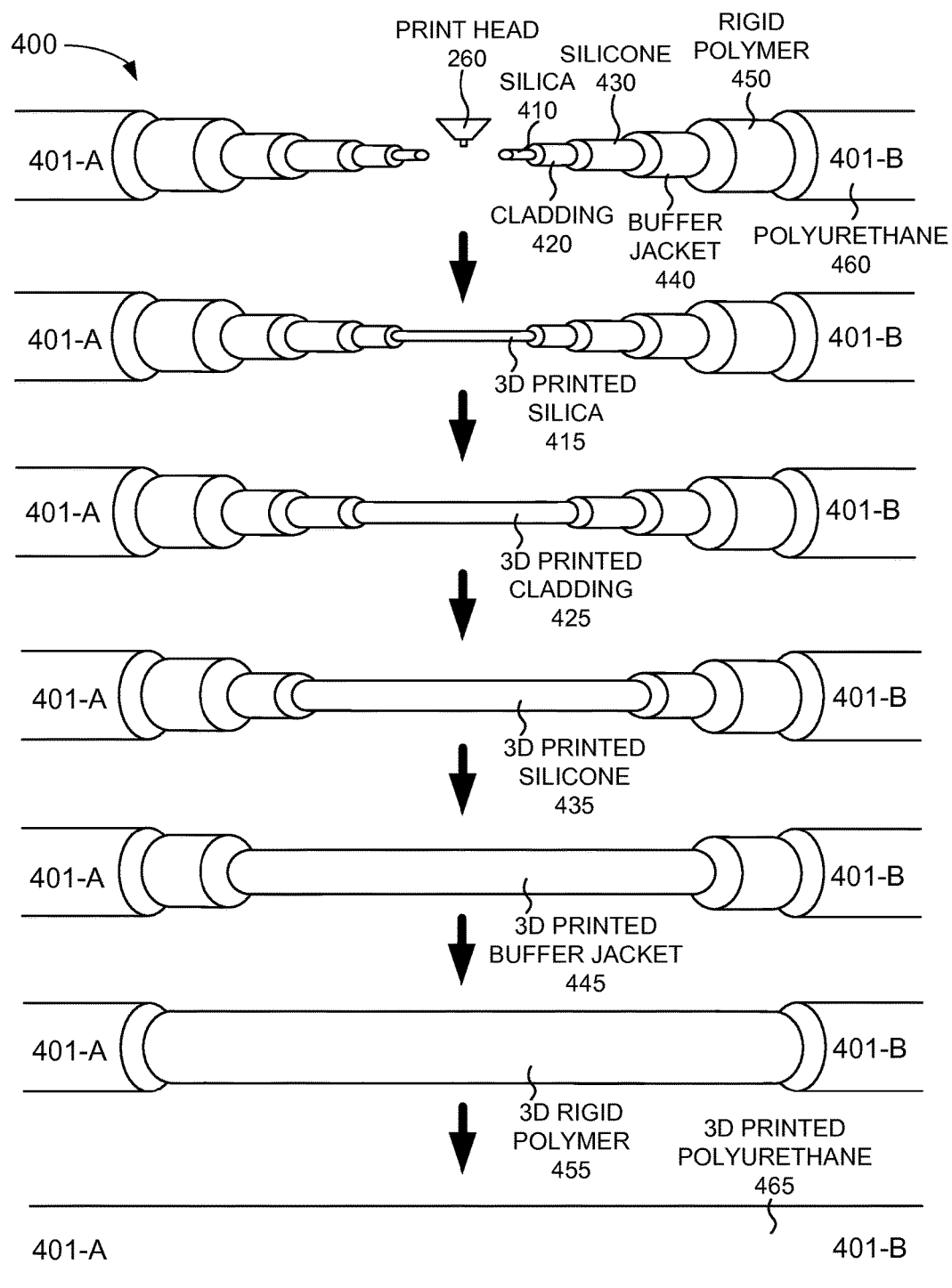
FIG. 4 is a diagram illustrating a sequence of layers printed using the print head of FIG. 3A.

FIG. 4 is a diagram illustrating a sequence 400 of layers printed using print head 260 or hand-held unit 350. As shown in FIG. 4, sequence 400 may begin with fiber-optic cables 401-A and 401-B (which may correspond to fiber-optic cable 240 or fiber-optic cable 360) being aligned for splicing. Fiber-optic cables 401-A and 401-B may each include a silica optical fiber 410, a cladding layer 420, a silicone layer 430, a buffer jacket layer 440, a rigid polymer layer 450, and a polyurethane layer 460.

Print head 260 may proceed to 3D print a junction between fiber-optic cables 401-A and 401-B. Print head 260 may 3D print a silica optical junction 415. Silica optical junction 415 may be 3D printed, for example, using a chlorinated silane precursor that cures into a silica ($SiO_2$) material. In some implementations, the silane precursor may include a doping agent, such as aluminum or geranium, to increase the index of refraction, or fluorine or boron, to decrease the index of refraction. Doping agents may be selected based on the index of refraction specification of the optical fiber being spliced. In some implementations, print head 260 may include a heating element that may be used to speed up a curing process of the silane material. Thus, after a bead or droplet of liquid silane material is deposited, the heating element may apply heat to the bead or droplet to speed up curing of the silane material into a silica glass material.

Print head 260 may then 3D print a cladding layer 425. 3D printed cladding layer 425 may be 3D printed, for example, by adding a doping agent to the silane precursor, such as aluminum or germanium. The doped silane precursor may be stored in a different print cartridge. As another example, 3D printed cladding layer 425 may be generated using Tollen's silver reaction. To use Tollen's silver reaction, a first cartridge may include silver nitrate dissolved in ammonia and a second cartridge may include a solution with an organic molecule that includes an aldehyde group, such as formaldehyde or acetylaldehyde. Upon mixing, the aldehyde group oxidizes and the silver nitrate is reduced to elemental silver. In other implementations, the cladding may be formed using a different metal material.

Print head 260 may then 3D print one or more protective layers. For example, print head 260 may 3D print a 3D printed silicon layer 435, a 3D printed buffer jacket layer 445, a 3D printed rigid polymer layer 455, and a 3D printed polyurethane layer 465. One or more of the protective layers may be printed with an extrusion printing mechanism using a fused filament fabrication process. In a fused filament fabrication process, an extrusion head nozzle may apply heat to a thermoplastic filament to melt the filament past a glass transition temperature and to deposit the melted material. Thus, in some implementations, thermoplastic polymers may be used to deposit one or more of 3D printed silicon layer 435, a 3D printed buffer jacket layer 445, a 3D printed rigid polymer layer 455, and a 3D printed polyurethane layer 465.

Although FIG. 4 illustrates sequence 400 of 3D printed layers of a splicing junction of fiber-optic cables, in other implementations, sequence 400 may include fewer layers, different layers, differently arranged layers, or additional layers than the ones depicted in FIG. 4.

Figure 5A:
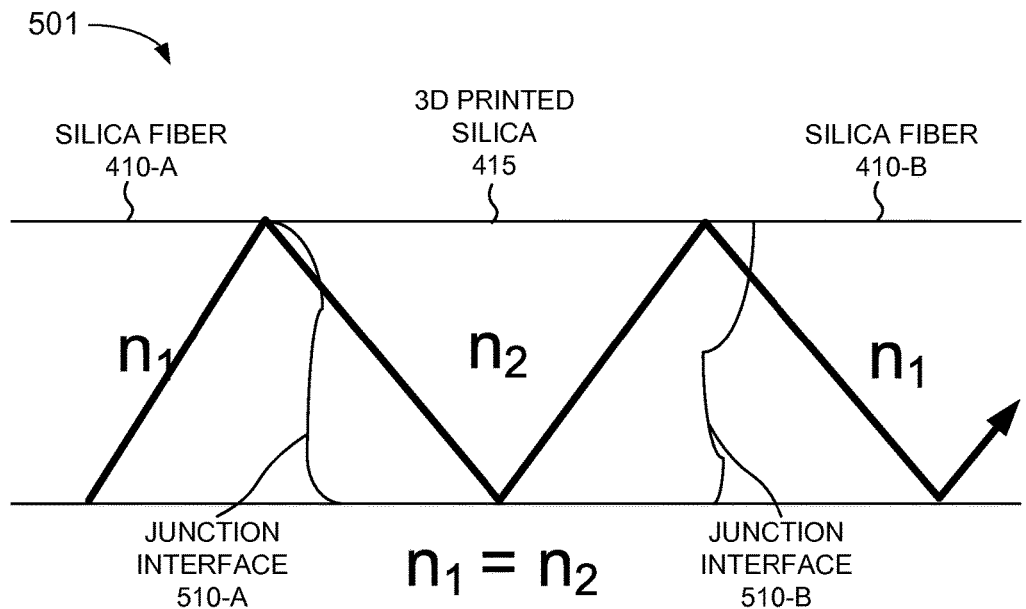
FIG. 5A is a diagram illustrating a three dimensionally printed optical junction according to one or more implementations described herein.

FIG. 5A is a diagram illustrating a three dimensionally printed optical junction 501 according to one or more implementations described herein. As shown in FIG. 5A, optical junction may include first silica optical fiber 410-A joined to 3D printed silica junction 415 via first junction interface 510-A and 3D printed silica junction 415 joined to second silica optical fiber 410-B via second junction interface 510-B. As shown, in FIG. 5A, the index of refraction $n_1$ for 3D printed silica junction 415 is selected to be substantially equal to the index of refraction $n_2$ for optical fibers 410-A and 410-B.

As further shown in FIG. 5A, junction interfaces 510-A and 510-B need not be smooth or straight. Print head 260 may be able to sense the edges of junction interfaces 510-A and 510-B using proximity sensors 330 and may extend 3D printed silica junction 415 to the sensed edges of junction interfaces 510-A and 510-B as each individual layer of 3D printed silica junction 415 is deposited or otherwise formed by print head 260. In some implementations, print head 260 may not be able to reach a particular portion of the area that is to be filled with 3D printed silica if a junction interface includes a protrusion. In such situation, print head 260 may either include a cutting tool to smooth out a junction interface or silica may be 3D printed into the inaccessible area from another direction using a different print head or by rotating the print head into a different orientation (as explained below with respect to different print head assembly implementations described with reference to FIGS. 6A-6C).

Figure 5B:
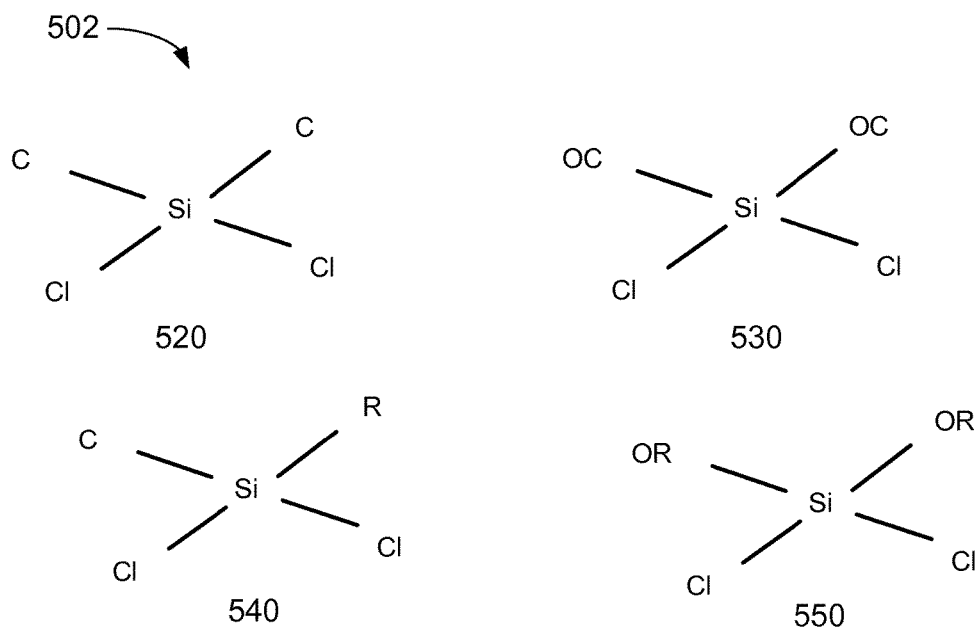
FIG. 5B is a diagram illustrating exemplary precursors that may be used to print the optical junction of FIG. 5A according to one or more implementations described herein.

FIG. 5B is a diagram illustrating exemplary precursors 502 that may be used to print 3D printed silica junction 415. As shown in FIG. 5B, precursors 502 may include, for example, a dichloro-dimethyl-silane precursor 520, a dichloro-dimethoxy-silane precursor 530, an R-dichloro-methyl-silane precursor 540, and a di-OR-dichloro-silane precursor 550. The functional group R may be selected based on the characteristics of a particular optical fiber. For example, the functional R group may include a functional group that includes a dopant selected to impart a particular index of refraction to 3D printed silica junction 415. For example, the functional group may include aluminum or germanium to increase the index of refraction, or fluoride or boron to reduce the index of refraction. The precursor may be deposited as a liquid via an inkjet nozzle of printing mechanism 310 in thin layers and may cure into a solid silica material. Although FIG. 5B illustrates precursors 502, in other implementations, precursors 502 may include fewer precursors, different precursors, or additional precursors than the ones depicted in FIG. 5B.

Figure 6A:
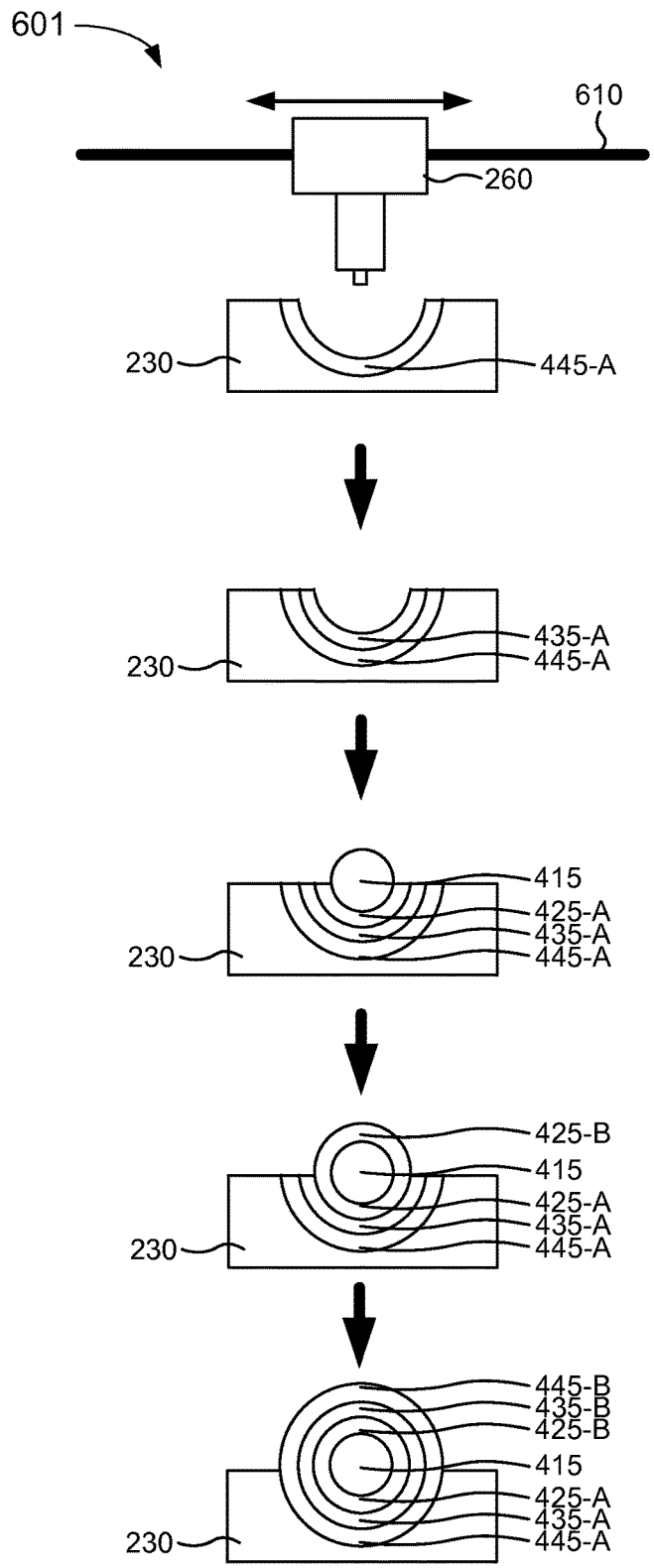
FIGS. 6A-6C are diagrams illustrating exemplary print head configurations according to one or more implementations described herein.
Figure 6B:
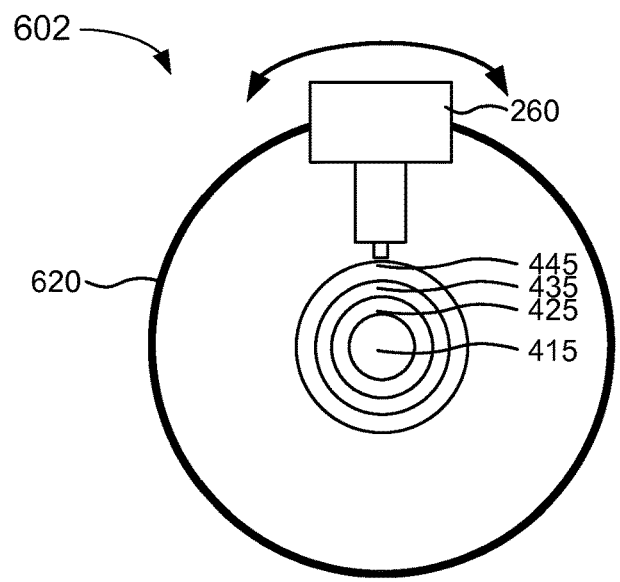
Figure 6C:
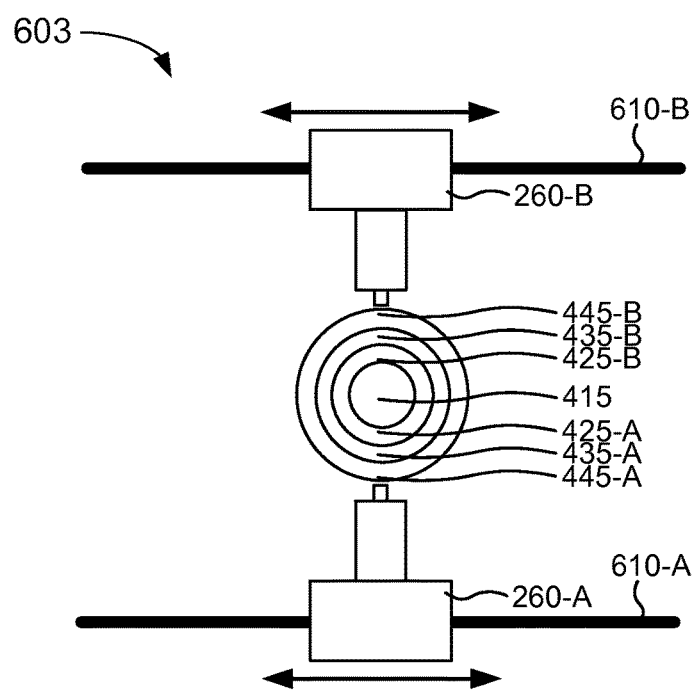

FIGS. 6A-6C are diagrams illustrating exemplary print head configurations according to one or more implementations described herein. FIG. 6A illustrates a first configuration 601 in which print head 260 is configured to move linearly in a plane with respect to track 230. As shown in FIG. 6A, print head 260 may be configured to move along a linear guide rod 610 in an X direction with respect to track 230. While not shown in FIG. 6A, print head 260 may further be configured to move in a Y direction by way of a second linear guide rod and may be configured to move in a Z direction by way of a third linear guide rod.

In the implementation of FIG. 6A, print head 260 may print a bottom half of each layer of the fiber-optic cable junction in reverse order, may print the optical fiber junction, and may then print the top half of each layer of the fiber-optic layer junction. For example, print head 260 may print the bottom half of one or more protective layers (e.g., the bottom half 445-A of 3D printed buffer jacket layer, followed by the bottom half 435-A of 3D printed silicon layer). Print head 260 may further print the bottom half 425-A of 3D printed cladding layer, after which print head 260 may print 3D silica optical junction 415. After 3D printed silica optical junction 415 is formed, print head 260 may print the top half 425-B of 3D printed cladding layer, followed by the top half of one or more protective layers, in an order that is reverse of the order used to print the bottom halves (e.g., top half 435-B of 3D printed silicon layer, followed by top half 445-B of 3D printed buffer jacket layer).

FIG. 6B illustrates a second configuration 602 in which print head 260 is configured to move in a circular motion around fiber-optic cables 401. As shown in FIG. 6B, print head 260 may be configured to move along a circular guide rod 620 in an X-Y plane with respect to fiber-optic cables 401 (wherein the Z plane is in the longitudinal direction of fiber-optic cables 401). While not shown in FIG. 6B, print head 2B0 may further be configured to move in a Y direction by way of a first linear guide rod and may be configured to move in a Z direction by way of a second linear guide rod.

In the implementation of FIG. 6B, print head 260 may print 3D printed silica optical junction 415 using track 230 (not shown in FIG. 6B). Track 230 may then be removed and print head 260 may print 3D printed cladding layer 425 on 3D printed silica optical junction 415 by moving around 3D printed silica optical junction 415 in a circular motion along circular guide rod 620. After printing 3D printed cladding layer 425, print head 260 may print one or more protective layers on top of 3D printed cladding layer 425 by moving in a circular motion along circular guide rod 620 (e.g., 3D printed silicon layer 435, followed by 3D printed buffer jacket layer 445).

FIG. 6C illustrates a third configuration 603 in which a first print head 260-A 3D prints a top half of a fiber-optic cable splicing junction and in which a second print head 260-B 3D prints a bottom half of the fiber-optic cable splicing junction. As shown in FIG. 6C, first print head 260-A may be configured to move along a first linear guide rod 610-A in an X direction with respect to track 230. While not shown in FIG. 6A, first print head 260-A may further be configured to move in a Y direction by way of a second linear guide rod and may be configured to move in a Z direction by way of a third linear guide rod. Furthermore, second print head 260-B may be configured to move along a second linear guide rod 610-B in an X direction with respect to track 230. While not shown in FIG. 6C, second print head 260-B may further be configured to move in a Y direction by way of a second linear guide rod and may be configured to move in a Z direction by way of a third linear guide rod.

In the implementation of FIG. 6C, one of the print heads (e.g., top print head 260-B) may 3D print silica optical junction 415 using track 230 (not shown in FIG. 6C). Track 230 may then be removed and bottom print head 260-A may print bottom half 425-A of the 3D printed cladding layer while, at substantially the same time, top print head 260-B may print top half 425-B of the 3D printed cladding layer. After the cladding layer is printed, bottom print head 260-A and top print head 260-B may print one or more protective layer, wherein bottom print head 260-A prints the bottom half of each protective layer and top print head 260-B prints the corresponding top half of each protective layer at substantially the same time. For example, bottom print head 260-A may print bottom half 435-A of a 3D printed silicone layer while top print head 260-B prints top half 435-B of the 3D printed silicone layer, followed by bottom print head 260-A printing bottom half 445-A of a 3D printed buffer jacket layer, while top print head 260-B prints top half 445-B of the 3D printed buffer jacket layer.

Although FIGS. 6A-6C illustrate particular print head configurations, other implementations may use a print head configuration different from the configurations shown in FIGS. 6A-6C. Furthermore, Although FIGS. 6A-6C show exemplary components of configurations 601, 602, and 603, in other implementations, configurations 601, 602, or 603 may include fewer components, different components, differently arranged components, or additional components than the ones depicted in FIGS. 6A-6C. Additionally or alternatively, one or more components of configurations 601, 602, or 603 may perform functions described as being performed by one or more other components of configurations 601, 602, or 603.

Figure 7:
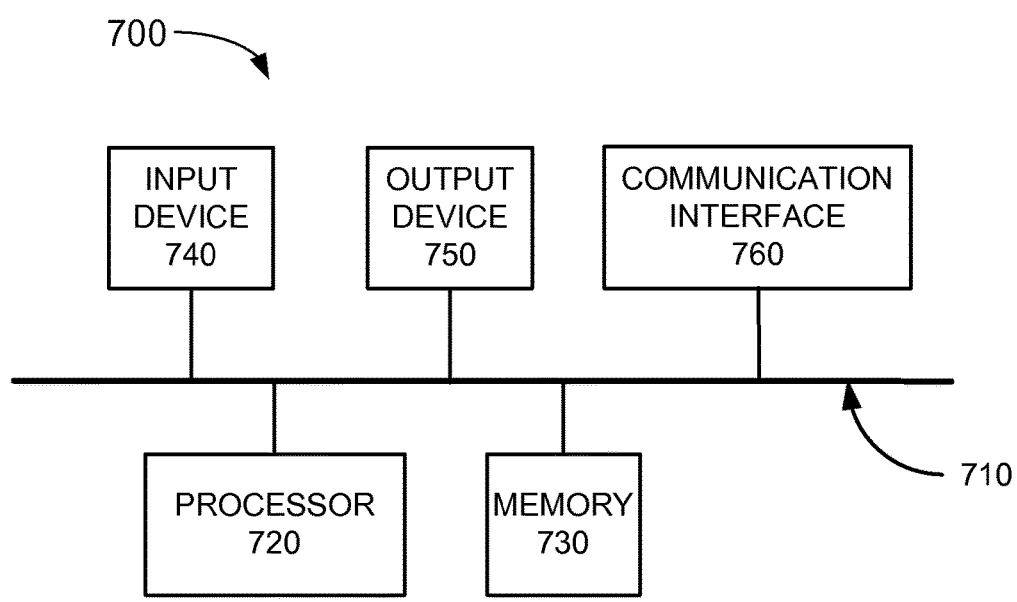
FIG. 7 is a diagram illustrating exemplary components of the controller of FIG. 2B.

FIG. 7 is a diagram illustrating exemplary components of a device 700. Each of print head controller 265, assembly controller 285, and/or a controller included in hand-held unit 350 may include one or more devices 700. As shown in FIG. 7, device 700 may include a bus 710, a processor 720, a memory 730, an input device 740, an output device 750, and a communication interface 760.

Bus 710 may include a path that permits communication among the components of device 700. Processor 720 may include any type of single-core processor, multi-core processor, microprocessor, latch-based processor, and/or processing logic (or families of processors, microprocessors, and/or processing logics) that interprets and executes instructions. In other embodiments, processor 720 may include an application-specific integrated circuit (ASIC), a field-programmable gate array (FPGA), and/or another type of integrated circuit or processing logic.

Memory 730 may include any type of dynamic storage device that may store information and/or instructions, for execution by processor 720, and/or any type of non-volatile storage device that may store information for use by processor 720. For example, memory 730 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 740 may allow an operator to input information into device 700. Input device 740 may include, for example, a keyboard, a mouse, a pen, a microphone, a remote control, an audio capture device, an image and/or video capture device, a touch-screen display, and/or another type of input device. In some embodiments, device 700 may be managed remotely and may not include input device 740. In other words, device 700 may be "headless" and may not include a keyboard, for example.

Output device 750 may output information to an operator of device 700. Output device 750 may include a display, a printer, a speaker, and/or another type of output device. For example, device 700 may include a display, which may include a liquid-crystal display (LCD) for displaying content to the customer. In some embodiments, device 700 may be managed remotely and may not include output device 750. In other words, device 700 may be "headless" and may not include a display, for example.

Communication interface 760 may include a transceiver that enables device 700 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 760 may include a transmitter that converts baseband signals to radio frequency (RF) signals and/or a receiver that converts RF signals to baseband signals. Communication interface 760 may be coupled to an antenna for transmitting and receiving RF signals.

Communication interface 760 may include a logical component that includes input and/or output ports, input and/or output systems, and/or other input and output components that facilitate the transmission of data to other devices. For example, communication interface 760 may include a network interface card (e.g., Ethernet card) for wired communications and/or a wireless network interface (e.g., a WiFi) card for wireless communications. Communication interface 760 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 700 may perform certain operations relating to control of a process for splicing fiber-optic cables using 3D printing. Device 700 may perform these operations in response to processor 720 executing software instructions contained in a computer-readable medium, such as memory 730. A computer-readable medium may be defined as a non-transitory memory device. A memory device may be implemented within a single physical memory device or spread across multiple physical memory devices. The software instructions may be read into memory 730 from another computer-readable medium or from another device. The software instructions contained in memory 730 may cause processor 720 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 7 shows exemplary components of device 700, in other implementations, device 700 may include fewer components, different components, additional components, or differently arranged components than depicted in FIG. 7. Additionally or alternatively, one or more components of device 700 may perform one or more tasks described as being performed by one or more other components of device 700.

Figure 8:
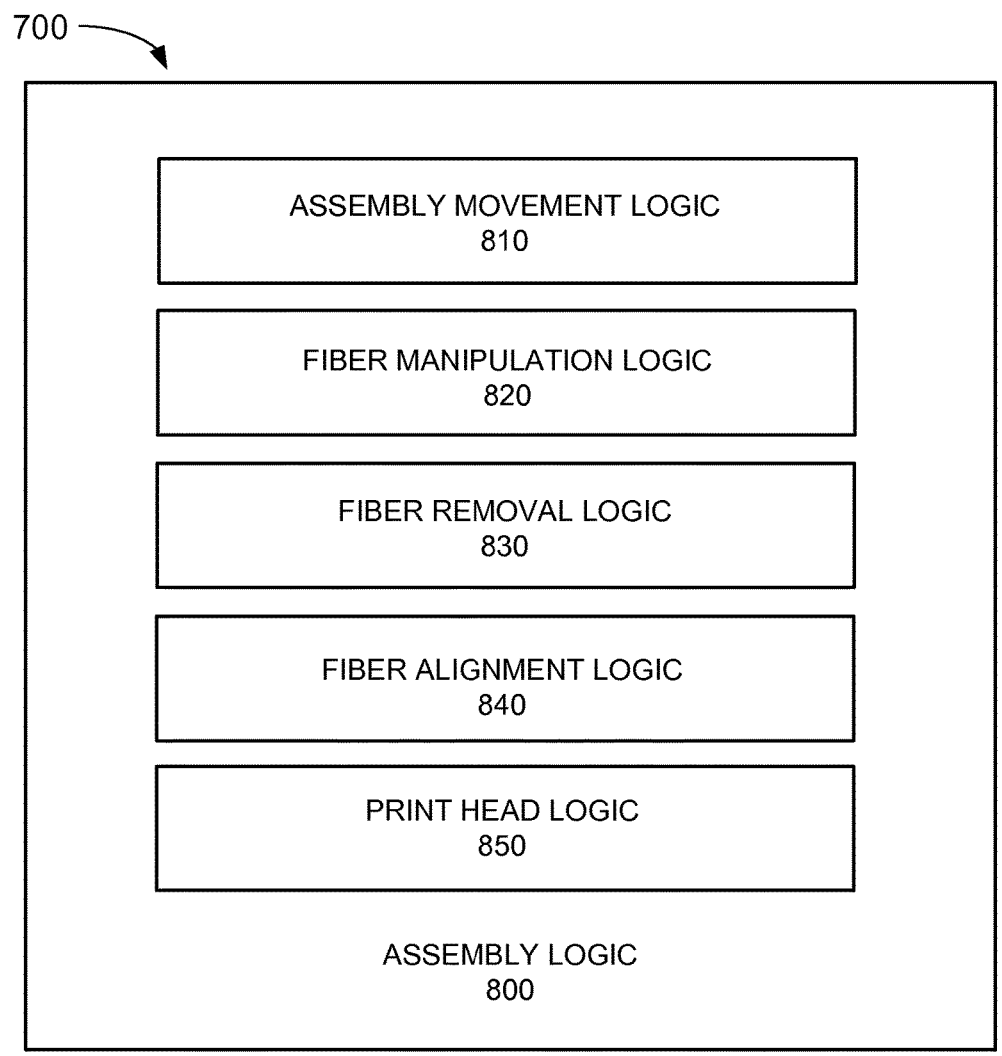
FIG. 8 is a diagram illustrating exemplary functional components of the controller of FIG. 2B.

FIG. 8 is a diagram illustrating exemplary functional components of device 700. The functional components of device 700 may be implemented, for example, via processor 720 executing instructions from memory 730. Additionally or alternatively, some or all of the functional components of device 700 may be hard-wired. As shown in FIG. 8, device 700 may include assembly movement logic 810, fiber manipulation logic 820, fiber removal logic 830, fiber alignment logic 840, and print head logic 850.

Assembly movement logic 810 may be configured to control movement assembly 280 and to direct movement assembly 280 to a particular location in robotic silo 210. For example, assembly movement logic 810 may store locations of particular fiber-optic cables 240 and may, in response to receiving a request to splice a particular fiber-optic cable 240, control movement assembly 280 to move robotic device 225 to a location associated with the particular fiber-optic cable 240

Fiber manipulation logic 820 may be configured to control robotic arm 270 to manipulate a particular fiber-optic cable 240 to a particular track 230 or to otherwise move the particular fiber-optic cable 240. Fiber removal logic 830 may be configured to remove a faulty section of fiber-optic cable 240 and/or to remove a previously created splicing junction. For example, fiber removal logic 830 may direct a cutting tool (e.g., located on robotic arm 270) to remove a section of fiber-optic cable or a splicing junction.

Fiber alignment logic 840 may be configured to align first fiber-optic cable 240-A and second fiber-optic cable 240-B using track 230 and/or other alignment techniques or devices. For example, fiber alignment logic 840 may measure an alignment of first fiber-optic cable 240-A and second fiber-optic cable 240-B using optical sensors and may adjust first fiber-optic cable 240-A and second fiber-optic cable 240-B if the alignment is not satisfactory.

Print head logic 850 may be configured to control print head 260 to 3D print a junction between first fiber-optic cable 240-A and second fiber-optic cable 240-B. For example, print head logic 850 may select a particular sequence of layers, may select one or more precursor cartridges for each layer, may select a thickness for a particular layer, and/or may control other aspects of the operation of print head 260.

Although FIG. 8 shows exemplary functional components of device 700, in other implementations, device 700 may include fewer functional components, different functional components, differently arranged functional components, or additional functional components than depicted in FIG. 8. Additionally or alternatively, one or more functional components of device 700 may perform functions described as being performed by one or more other functional components of device 700.

Figure 9:
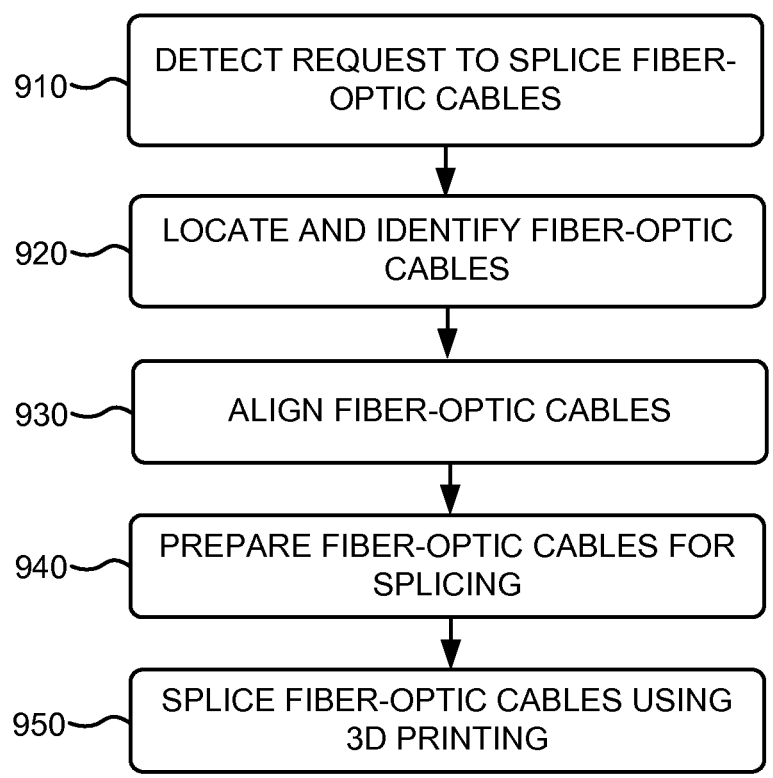
FIG. 9 is a first flowchart for controlling a fiber splicing assembly according to an implementation described herein.

FIG. 9 is a first flowchart for controlling a fiber splicing assembly according to an implementation described herein. In one implementation, the process of FIG. 9 may be performed by robotic device 225. In other implementations, some or all of the process of FIG. 9 may be performed by another device or a group of devices separate from and/or including robotic device 225.

The process of FIG. 9 may include detecting a request to splice fiber-optic cables (block 910). For example, an administrator associated with central office 110 may send a request to robotic device 225 to perform a particular splicing operation. As an example, the administrator may specify that two particular fiber-optic cables be spliced, that a particular fiber-optic cable be tested using a loopback test, that a faulty section in a particular fiber-optic cable be repaired, that an existing splice in two fiber-optic cables be removed, and/or any other splicing operation that may be performed by robotic device 225.

The fiber-optic cables may be located and identified (block 920). For example, assembly movement logic 810 may access a database of fiber-optic cables associated with robotic silo 210 and may determine a location associated with the fiber-optic cables associated with the requested splicing operation. Assembly movement logic 810 may then control movement assembly 280 to move robotic device 225 to the determined location, wherein reader 262 may be used to identify the fiber-optic cables. As another example, assembly movement logic 810 may control movement assembly 280 to move across robotic silo 210 while reader 262 scans barcodes (or another type of machine-readable identifier) of fiber-optic cables to identify the fiber-optic cables associated with the requested splicing operation.

The fiber-optic cables may be aligned (block 930). For example, fiber manipulation logic 820 and fiber alignment logic 840 may control robotic arm 270 to align the identified fiber-optic cables in track 230 and/or using another alignment technique. The fiber-optic cables may be prepared for splicing (block 940) and the fiber-optic cables may be spliced using 3D printing (block 950). A process for preparing and splicing fiber-optic cables is described below with reference to FIG. 12.

Figure 10:
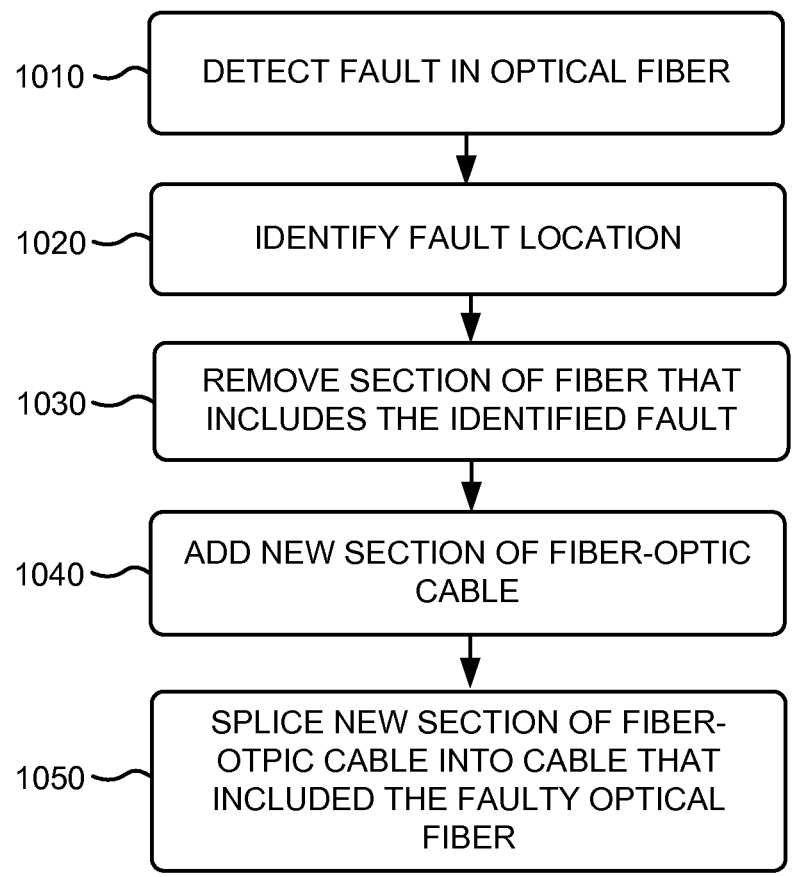
FIG. 10 is a second flowchart for controlling a fiber splicing assembly according to an implementation described herein.

FIG. 10 is a second flowchart for controlling a fiber splicing assembly according to an implementation described herein. In one implementation, the process of FIG. 10 may be performed by robotic device 225. In other implementations, some or all of the process of FIG. 10 may be performed by another device or a group of devices separate from and/or including robotic device 225.

The process of FIG. 10 may include detecting a fault in an optical fiber (block 1010). As an example, an administrator associated with central office 110 may receive a report of a fault being detected in a particular section of a fiber-optic cable and may send a request to robotic device 225 to repair the fault. As another example, the administrator may request that a loopback test be performed on a fiber-optic cable and may determine a fault in the fiber-optic test based on the results of the loopback test.

The faulty location may be identified (block 1020). For example, assembly movement logic 810 may control movement assembly 280 to move to the fiber-optic cable associated with the detected fault and reader 262 may identify the fiber-optic cable based on a machine-readable identifier. The section of fiber that includes the identified fault may be removed (block 1030). For example, fiber removal logic 830 may control robotic arm 270 to remove a section (e.g., with a cutting tool) of the fiber-optic cable that includes the detected fault.

A new section of fiber-optic cable (block 1040) and the new section of fiber-optic cable may be spliced into the fiber-optic cable that included the faulty optical fiber (block 1050). For example, fiber manipulation logic 820 may control robotic arm 270 to retrieve a section of a new fiber-optic cable from a storage location of fiber-optic cables and align the new section with a first end of the fiber-optic cable from which the faulty section was removed. Print head logic 850 may be used to splice the first end of the fiber-optic cable to a first end of the new section and the second of the new section may be aligned with the second end of the fiber-optic cable. Print head logic 850 may then be used to splice the second end of the new section with the second end of the fiber-optic cable, thereby replacing the removed faulty section with the new section of fiber-optic cable.

Figure 11:
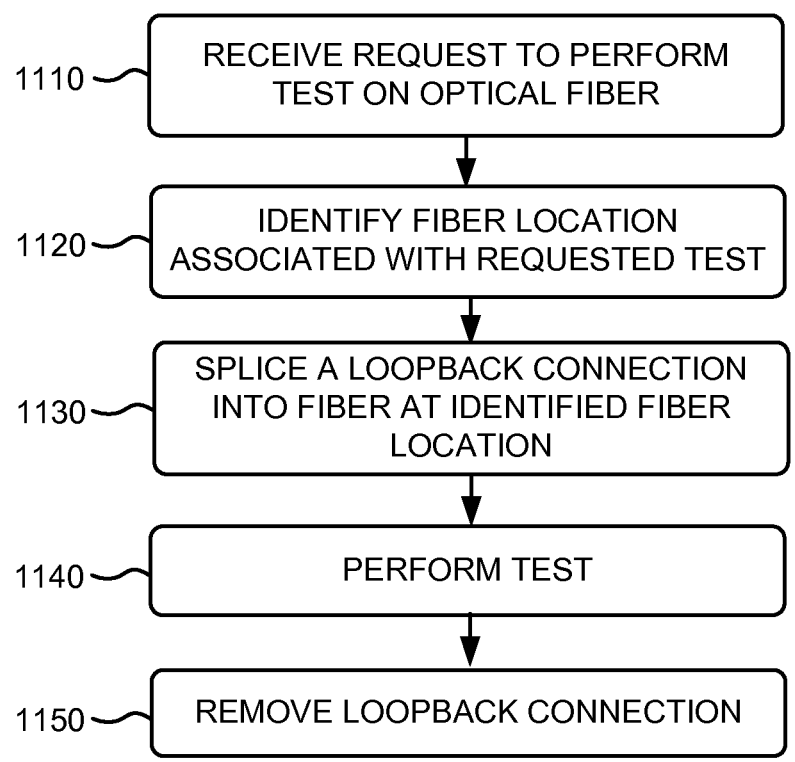
FIG. 11 is a third flowchart for controlling a fiber splicing assembly according to an implementation described herein.

FIG. 11 is a third flowchart for controlling a fiber splicing assembly according to an implementation described herein. In one implementation, the process of FIG. 11 may be performed by robotic device 225. In other implementations, some or all of the process of FIG. 11 may be performed by another device or a group of devices separate from and/or including robotic device 225.

The process of FIG. 11 may include receiving a request to perform a test on an optical fiber (block 1110). For example, an administrator associated with central office 110 may select to perform a test on a particular fiber-optic cable and may send a request to robotic device 225 to perform a loopback test on the fiber-optic cable. The fiber location associated with the requested test may be identified (block 1120). For example, assembly movement logic 810 may control movement assembly 280 to move to the fiber-optic cable associated with the selected test and reader 262 may identify the fiber-optic cable based on a machine-readable identifier.

A loopback connection may be spliced into the fiber at the identified fiber location (block 1130). For example, fiber manipulation logic 820 may control robotic arm 270 to retrieve a loopback test cable section from a storage location and to align the loopback test section with the particular fiber-optic cable. Print head logic 850 may then control print head 260 to splice the loopback section onto the particular fiber-optic cable.

The test may be performed (block 1140) and the loopback connection may be removed (block 1150). For example, the administrator may run tests on the fiber-optic cable using the loopback connection. When the tests are complete, the administrator may instruct robotic device 225 to remove the loopback section and fiber manipulation logic 820 may control robotic arm 270 to remove the loopback test section that was previously spliced onto the particular fiber-optic cable.

Figure 12:
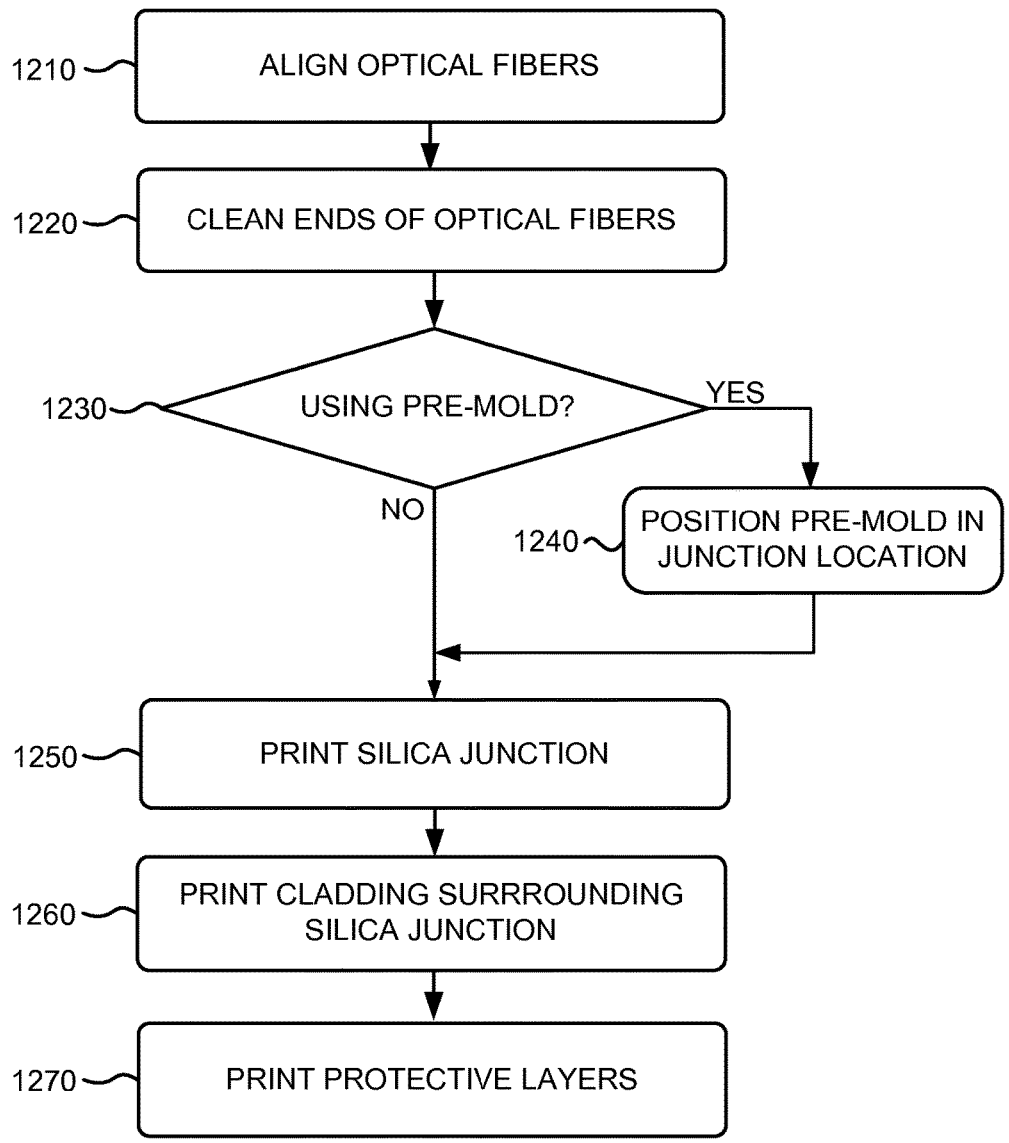
FIG. 12 is a flowchart for print splicing optical fibers according to an implementation described herein.

FIG. 12 is a flowchart for print splicing optical fibers according to an implementation described herein. In one implementation, the process of FIG. 12 may be performed by print head 260. In other implementations, some or all of the process of FIG. 12 may be performed by another device or a group of devices separate from and/or including print head 260.

The process of FIG. 12 may include aligning optical fibers (block 1210). As an example, robotic arm 270 may align fiber-optic cables 240-A and 240-B in track 230. As another example, a technician may align fiber-optic cables 360-A and 360-B using hand-held unit 350. The ends of the optical fibers may be cleaned (block 1220). As an example, print head 260 may use a stream of pressurized air to clean junction interfaces 510-A and 510-B. As another example, print head 260 may use a cartridge that includes a solvent to clean junction interfaces 510-A and 510-B.

A determination may be made as to whether to use a pre-mold (block 1230). A pre-mold may include a section of silica shaped to fit between silica fibers 410-A and 410-B. Using a pre-mold may reduce the printing time of 3D printed silica junction 415. A pre-mold may be selected if a pre-mold is available and/or if a faster printing time is required. In some implementations, a standard pre-mold may be used for a particular type of optical fiber (e.g., a particular thickness, a particular index of refraction, etc.). Additionally or alternatively, different pre-molds may be selected based on the shape of junction interfaces 510-A and 510-B.

If a pre-mold is selected (block 1230—YES), the pre-mold may be positioned in the junction location (block 1240). As an example, robotic arm 270 may retrieve a pre-mold from a storage location and may position the pre-mold within track 230. As another example, a technician using hand-held unit 350 may place a pre-mold in the track of hand-held unit 350 and may position fiber-optic cables 360-A and 360-B within a particular distance of the pre-mold. Processing may continue to block 1250. If a pre-mold is not selected (block 1230—NO), processing may also continue to block 1250.

A silica junction may be printed (block 1250). For example, print head 260 may select a particular cartridge 320 containing a silane precursor and may use printing mechanism 310 to 3D print silica junction 415 between silica fiber 410-A and silica fiber 410-B via, for example, 3D inkjet printing. The liquid silane precursor may cure to silica to form silica junction 415.

A cladding surrounding the silica junction may be printed (block 1260). For example, print head 260 may select one or more cartridges 320 containing precursors and may use printing mechanism 310 to deposit 3D printed cladding layer 425 on top of 3D printed silica junction 415. In some implementations, print head 260 may use a silica precursor that includes a dopant that will increase the index of refraction of a silica material. In other implementations, print head 260 may select a first cartridge with a silane precursor and a second cartridge with a dopant. In yet other implementations, print head 260 may use Tollen's silver reaction. For example, print head 260 may select a first cartridge that includes silver nitrate in an ammonia solution and a second cartridge that includes a solution with an aldehyde group (e.g., formaldehyde, acetylaldehyde, etc.), and may combine the solutions to form a layer of silver on top of 3DD printed silica junction.

In some implementations, print head 260 may rotate around 3D printed silica junction 415 to print 3D printed cladding layer 425 (e.g., see FIG. 6B). In other implementations, print head 260 may deposit a bottom half of the cladding layer, then deposit 3D printed silica junction 415, and may then deposit the top half of the cladding layer (e.g., see FIG. 6A). In yet other implementations, a top print head 260 may print the top half of the cladding layer and a bottom print head 260 may print the bottom half of the cladding layer (e.g., see FIG. 6C).

One or more protective layers may be printed (block 1270). For example, print head 260 may print one or more of 3D printed silicone layer 435, 3D printed buffer jacket 445, 3D printed rigid polymer 455, and 3D printed polyurethane layer 465. Each layer may be printed using a particular printing mechanism 310 (e.g., an extrusion printing mechanism) and one or more cartridges or other precursors-containing mechanism (e.g., a filament providing mechanism).

FIGS. 13A-13D are diagrams illustrating three dimensional printing of an electrical connection according to one or more implementations described herein. In addition to splicing fiber-optic cables to form an optical connection, implementations described herein may be used to form electrical connections. For example, robotic device 225 may be used to form electrical connections between coaxial cable, Ethernet cables, and/or other types of electrical connections. As another example, hand-held unit 350 may be configured to 3D print electrical connectors in the field. Furthermore, robotic device 225 and/or hand-held unit 350 may include a metal soldering tool for connecting electrical wiring to a 3D printed connector. Alternatively, an electroplating technique may be used to print metal monolayers using reagent schemes to chemically bond metals together. Furthermore, insulating shielding may be 3D printed on top of a metal connection made with the metal soldering tool.

Figure 13A:
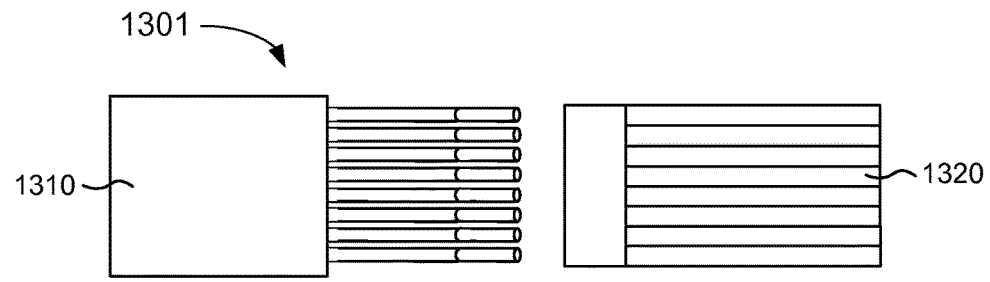
FIGS. 13A-13D are diagrams illustrating three dimensional printing of an electrical connection according to one or more implementations described herein.
Figure 13B:
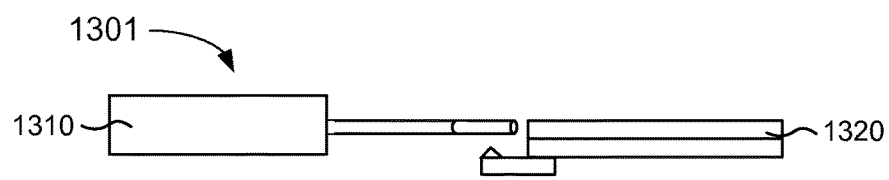
Figure 13C:
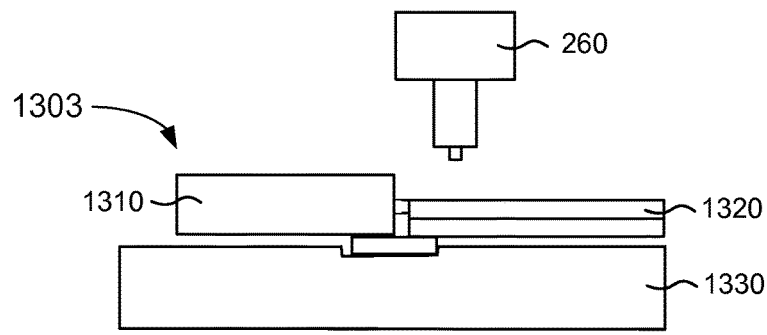
Figure 13D:
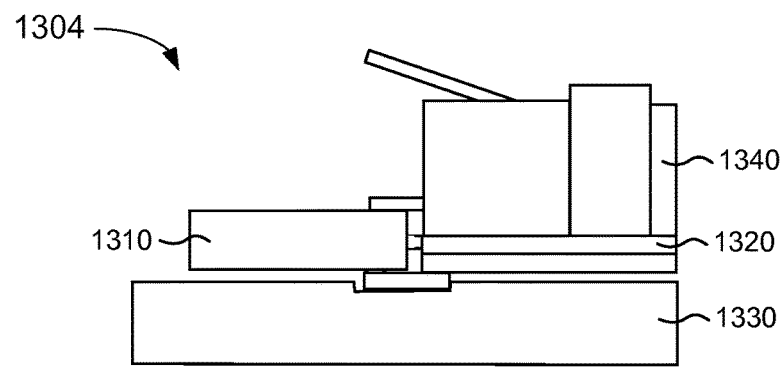

FIG. 13A illustrates a pre-mold 1301 for an electrical connector that includes a male connector 1310 and a corresponding female connector 1320. For example, male connector 1310 and female connector 1320 may correspond to an RJ-45 connector, and RJ-11 connector, and/or another type of electrical connector. FIG. 13B illustrates a side view of pre-mold 1301. FIG. 13C illustrates a system 1303 that includes male connector 1310 and female connector 1320 being aligned on a track 1330 with print head 260 positioned to 3D print the rest of the connector. FIG. 13D illustrates a system 1304 that includes the completed connector, which includes 3D printed portion 1340.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 9-12, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A device configured to splice together fiber-optic cables by three-dimensional printing of a silane material, comprising:
 a robotic arm installed in a fiber-optic distribution hub;
 a plurality of cartridges, wherein a particular one of the plurality of cartridges includes a particular precursor material;
 a print head configured to deposit the precursor material from the particular one of the plurality of cartridges; and
 a pair of tracks configured to align optical fibers;
 wherein the device includes logic configured to:
  control the print head to print an optical fiber junction between the optical fibers using the particular one of the plurality of cartridges;
  control the print head to print a cladding onto the optical fiber junction using a second one of the plurality of cartridges; and
  control the print head to print at least one protective layer onto the cladding using a third one of the plurality of cartridges.

2. The device of claim 1, further comprising:
 a mechanism to position a pre-mold inside the pair of tracks, wherein the pre-mold is configured to further align the optical fibers.

3. The device of claim 1, wherein the print head is further configured to use a stream of air to clean the optical fibers.

4. The device of claim 1, wherein the logic is further configured to:
 select an index of refraction for the cladding based on a fiber transmission characteristic associated with the optical fibers.

5. The device of claim 1, wherein the optical fiber junction is printed using a chlorinated silane.

6. The device of claim 1, wherein the cladding includes:
 a doped silica layer; or
 a metal layer.

7. The device of claim 1, wherein the print head is configured to move around the pair of tracks in a rotational motion.

8. The device of claim 1, wherein the print head corresponds to a first print head oriented in a first direction towards the pair of tracks, the device further comprising:
 a second print head, oriented in a second direction towards the pair of tracks, wherein the second direction is opposite to the first direction.

9. A system comprising:
 a fiber distribution hub including a plurality of fiber-optic cables, wherein a particular one of the plurality of fiber-optic cables includes a machine-readable identifier; and
 a robotic device configured to access particular ones of the plurality of fiber-optic cables, wherein the robotic device includes:

a print head configured to splice together the particular ones of the plurality of fiber-optic cables by three-dimensional printing of a silane material, and a controller configured to
- move to a particular location in the fiber distribution hub,
- identify the particular one of the plurality of fiber-optic cables based on the machine-readable identifier, and
- select the particular one of the plurality of fiber-optic cables for splicing based on the machine-readable identifier.

10. The system of claim 9, wherein the robotic device further includes:
a robotic arm configured to manipulate particular ones of the plurality of fiber-optic cables.

11. The system of claim 10, wherein the controller is further configured to:
control the robotic arm to remove the particular one of the plurality of fiber-optic cables.

12. The system of claim 9, wherein the controller is further configured to:
select another one of the plurality of fiber-optic cables; and
align the particular one of the plurality of fiber-optic cables with the selected other one of the plurality of fiber-optic cables.

13. The system of claim 12, wherein the controller is further configured to:
control the print head to print an optical fiber junction between optical fibers of the particular one of the plurality of fiber-optic cables and the other one of the plurality of fiber-optic cables, using a first one of a plurality of cartridges;
control the print head to print a cladding onto the optical fiber junction using a second one of the plurality of cartridges; and
control the print head to print at least one protective layer onto the cladding using a third one of the plurality of cartridges.

14. The system of claim 9, wherein the controller is further configured to:
identify a faulty section in the selected particular one of the plurality of fiber-optic cables;
remove the faulty section from the selected particular one of the plurality of fiber-optic cables; and
splice in a new section of fiber-optic cable into the particular one of the plurality of fiber-optic cables using the print head.

15. The system of claim 9, wherein the controller is further configured to:
add a loopback section to the particular ones of the plurality of fiber-optic cables using the print head.

* * * * *